Oct. 20, 1953    R. C. DU BOIS    2,656,444
PRESSURE SENSITIVE RESISTOR
Filed Oct. 16, 1952
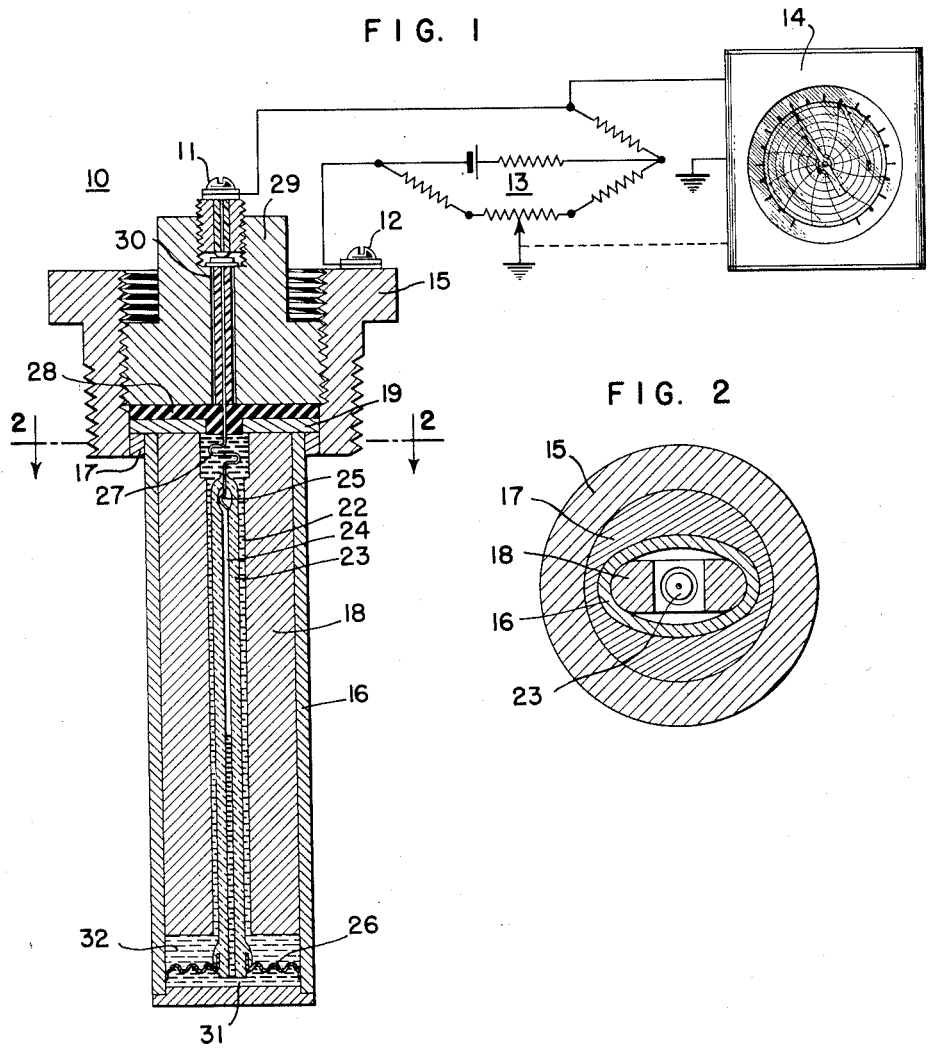
INVENTOR.
ROBERT C. DU BOIS
BY
Arthur H. Swanson
ATTORNEY.

Patented Oct. 20, 1953

2,656,444

UNITED STATES PATENT OFFICE 2,656,444

PRESSURE SENSITIVE RESISTOR

Robert C. Du Bois, Philadelphia, Pa., assignor to Minneapolis-Honeywell Regulator Company, Minneapolis, Minn., a corporation of Delaware Application October 16, 1952, Serial No. 315,154

10 Claims. (Cl. 201—55)

The general object of the present invention is to provide a new and improved pressure to electric transducer wherein an electrically conducting liquid is caused to rise and fall over an electrical element to change an electrical characteristic thereof. More particularly, the present invention is directed to a pressure to electric transducer where there is employed a capillary tube having an electrically conductive coating on the sides of the hole thereof with the capillary tube being completely sealed within a hollow collapsible member so that volume changes of the member will be reflected in the movement of an electrically short circuiting liquid over the coating in the capillary tube.

In a copending application of E. Victor Larson, entitled "Measuring Apparatus," filed on even date herewith, there is disclosed a pressure to electric transducer of the type under consideration in the present application. The Larson application shows an apparatus where a capillary tube having an electrically conductive coating on the hole thereof is sealed within a collapsible tube. An electrically conductive liquid fills a portion of the tube and extends into the hole to short circuit the coating and the extent of the short circuiting is dependent upon the state of collapse of the collapsible tube. In order that all the internal volume changes of the collapsible tube be reflected to the movement of the liquid within the capillary, the space outside of the capillary tube not occupied by the conductive liquid is filled with a further liquid less dense than the conductive fluid. The head of the conductive liquid within the capillary tube is selected to be such that it will support a higher head of the second liquid outside of the capillary tube so as to keep all space outside of the capillary tube filled. In such an apparatus as disclosed in said Larson case, the apparatus must always be maintained in an upright position so as to prevent the liquids from becoming interchanged in position. It must also be well protected from excessive vibration. It is also desirable to have a maximum of conductive surface available for contacting with the conducting liquid in order that the apparatus may be used over a wide range. This means maintaining the conducting liquid at a point near one end of the capillary tube with a maximum space available for sensing volume changes in the collapsible tube.

The present invention provides an apparatus having maximum protection for vibrational and positional forces, provides maximum range, while maintaining the many advantages of the Larson apparatus.

It is accordingly an object of the present invention to provide a new and improved pressure measuring apparatus.

A further object of the present invention is to provide a new and improved pressure measuring apparatus utilizing the rise and fall of an electrically conductive liquid in a capillary tube having a surface thereof coated with an electrically conductive coating.

A still further object of the present invention is to provide a hollow collapsible tube having sealed therein an electrical element into which is passed an electrically conductive liquid with the head of said liquid in said element supporting a second liquid outside of said element and with a separator for maintaining said liquids separated.

A still further object of the invention is to provide a new and improved pressure transducer of the type having a separator between a pair of liquids with the separator being preloaded to cause the other liquid to assume a desired position in said transducer.

A further object of the present invention is to provide a pressure transducer having a hollow collapsible tube having sealed therein an electrical element into which an electrically conducting liquid will pass and when all space outside of said element, except that occupied by said conducting liquid is filled with a second liquid which may be preloading a sealing member positioned between said liquids.

Another object of the present invention is to provide a new and improved pressure to electric transducer wherein an electrical capillary type element is sealed within a hollow collapsible tube and said element is free to move within said tube to protect the apparatus from vibrational forces.

Still another object of the present invention is to provide a pressure to electric transducer including a capillary tube sealed within a collapsible chamber with a resilient mounting for said tube in said chamber including a liquid seal for maintaining a liquid in the capillary tube separated from a second liquid which fills said chamber.

The various features of novelty which characterize this invention are pointed out with particularity in the claims annexed hereto and forming a part of the specification. For a better understanding of the invention, however, its advantages, and specific objects obtained with its use, reference should be had to the accompanying drawings and descriptive matter in which is illustrated and described a preferred embodiment of the invention.

Figure 1 shows a cross sectional view of the present invention and the manner in which it may be connected to a suitable indicating and recording apparatus; and Figure 2 shows a cross sectional view of a portion of Figure 1 taken along the center lines 2—2.

Referring now to Figure 1, the numeral 10 represents a form that a pressure to electric transducer made in accordance with the present invention may assume. This transducer apparatus has a pair of electrical terminals 11 and 12 which connect the apparatus to a suitable bridge network 13. This bridge network may be a part of a suitable indicating and recording mechanism 14 which will take the electrical balance conditions of the bridge 13 and convert them into an appropriate meter indication and recorder operation. An apparatus which is suitable for use in this particular arrangement is shown in the Walter P. Wills patent, 2,432,540, issued July 7, 1947. The Wills' apparatus is of the type which will respond to an electrical unbalance condition in the bridge 13 and will produce an appropriate meter operation as well as a rebalancing operation in the bridge 13.

Considering in greater detail the transducer 10, it will be seen to comprise a coupling 15 which is threaded on the outside and on the inside. The outer threads of the coupling 15 may be arranged to engage any appropriate threading in a vessel whose pressure is to be measured. Attached to and projecting below the coupling 15 is an elliptically shaped collapsible tube 16. This tube 16 is fastened to the coupling 15 by a filler element 17 which is circular on its outer edge to engage the coupling 15 and elliptically shaped on the inner hole to receive the tube 16. It is sealed by welding or any other appropriate means. The shape of the element 17 is shown best in Figure 2. The lower end of the tube 16 may be sealed by crimping or the fastening of a suitable sealing plate thereto.

Positioned within the collapsible tube 16 is a protective element 18. This element may be fastened at its upper end to a suitable washer 19 which fits over the outer edges of the tube 16 within the inner portion of the coupling 15. This protective element is generally selected to be a material which has substantially zero temperature coefficient of expansion. One such material which is satisfactory is Invar. The manner in which temperature compensation is effected by this will be discussed below. As shown in Figure 2, the cross sectional view of the element 18 is such that the ends of the element 18 engage the ends of the tube 16 while a space exists between the sides of the tube 16 and the sides of the element 18. This configuration protects the tube 16 in that as the tube has a high pressure applied to the external surface thereof, the tube will collapse against the sides of the element 18 and the stressing will not be sufficient to exceed the elastic limit of the tube. The ends of the tube 16 will be moved away from the element 19 and will tend to assume a more circular cylindrical shape so as to withstand maximum pressure. Details of certain types of tubes and protective elements are shown and claimed in a copending application of Philip J. Donald, entitled "Measuring Apparatus," filed on even date herewith.

The protective element has a hole 22 running the length thereof with a capillary tube 23 positioned therein. This capillary tube is formed of a nonporous ceramic material with a relatively small hole 24 running the length thereof with an opening at the lower end. The tube is sealed at its upper end and has a contacting electrode 25 engaging the inner surface of the capillary at the upper end. The tube 23 is supported at its lower end by a resilient diaphragm 26 which is sealed to the inner side of tube 16 and to the outer side of tube 23. At the upper end, the tube 23 is held in position by the wire 27 which is bent to provide a resilient connection to the contacting electrode 25. This wire 27 is held in position by a centering and sealing washer 28 which may be made of neoprene or the like. The washer 28 is held in position and compressed to cause a tight seal by a plug 29 which is threadedly engaging the inner threads of the plug 15. The plug 29 has a center hole 30 running therethrough with the wire 27 arranged to pass therein to the connecting terminal 11.

The tube 23 is of the type which has the inner surface thereof coated with an electrically conductive coating. This coating is generally a suitable metallic oxide which when formed on the sides of the hole of the tube has an appreciable resistance per unit area. This coating may be electrically short circuited by a suitable electrically conducting liquid, such as mercury. The coating extends from the contacting electrode 27 down to the opening at the bottom which projects into the tube 16 where the lower portion is filled with mercury 31.

If the mercury were the only liquid in the tube 16 and if it were desired to have the volume changes cause a rise and fall of mercury in the capillary tube 23, there would be an evacuated space above the mercury not only within the tube 23 but also outside in the tube 16. This is due to the mercury seeking its own level between the inside and outside in an evacuated system.

If the tube 16 were completely filled with mercury, the mercury would also fill the tube 23. As maximum sensitivity can be obtained only when all volume changes of tube 16 are felt only in tube 23, it is essential that all space outside of the tube 23 be filled with a liquid. To accomplish this end, a liquid 32 less dense than the mercury 31 is placed over the mercury outside of the tube 23. The height of the mercury will produce a head pressure which will equal the head pressure of a higher height of the liquid 32. The height of the liquid 32 is selected to be such that it will fill the space outside of tube 23. Thus, with the only space in the apparatus remaining inside tube 23 in the hole 24, the volume changes in the tube 16 will be felt only in the hole 24.

The liquid 32 may be a synthesized oil substitute. One fluid which has been successfully used is an oil known commercially as "Octoil." While a synthesized oil substitute is not required, the fluid that is used should have a low vapor pressure, low viscosity, a low temperature coefficient of expansion and a density which is less than the electrically conductive fluid which is supporting the fluid.

As shipping and vibrational forces may cause the fluids 31 and 32 to become displaced, or interchanged and cause destruction of the apparatus, there is a necessity to provide the resilient diaphragm 26. This also provides a barrier or separator for the two fluids. Thus, inversion of the apparatus will not cause the fluids to mix and not allow any of the fluid 32 to enter the hole 24. The diaphragm 26 also serves to permit a small amount of movement of the tube 23 along its longitudinal axis. Such movement is damped by the fluid surrounding the tube 23 and the combined effect is to protect the tube from destruction due to sudden shocks or impacts.

While one form of the invention presumes that the liquid 32 is less dense than the liquid 31, this is not essential if the resilient member 26 is preloaded. This may be done by directly preloading the member 26 or by putting the liquid 32 into the tube 16 under pressure. In other words, the preloading of the resilient member 26 will cause the member to exert a force upon the liquid 32 which will replace the needed head pressure from the liquid 31 rising in the hole 24. This makes a much wider group of liquids available for use as the liquid 32 in that the liquid 32 need not be less dense than the liquid 31. By replacing the head pressure in the apparatus by the preloading of the member 26, it is also possible to have the liquid 31 just inside the hole 24 at zero pressure and thus make available a larger range of movement for the liquid 31 over the coating on the sides of the hole 24.

Considering now the operation of the apparatus, let it first be assumed that the apparatus is fastened into a chamber whose pressure is to be measured. With an increase in pressure on the outside of the tube 16, the tube will tend to collapse and the internal volume thereof will decrease. Since the only space remaining is in the capillary 24, the mercury 31 will rise into the hole 24 to short out the coating on the capillary. This will result in a decrease in the resistance of the apparatus between terminals 11 and 12. This decrease in resistance will be indicated by a change in the balance of the bridge 13 and the indicating and recording apparatus 14 will operate until a balance point has been reached. The position of the recording pens and the indicating mechanism will be proportional to the pressure applied to the outside of the tube 16. A pressure decrease will work in the opposite direction to draw mercury out of the tube 23 so as to reduce the short circuiting effect of the mercury 31 on the capillary coating.

Inasmuch as the mercury 31 has an appreciable temperature coefficient of expansion, it is essential that the apparatus be arranged so that there is a minimum effect resulting from this. This is accomplished by maintaining the volume of the mercury small, so that less compensation is required, and selecting the other materials so that their coefficients of expansion will tend to cancel that of the mercury.

Thus, the tube 16 is arranged to expand slightly with temperature increases, the protecting element is selected to have zero, or nearly zero, temperature coefficient of expansion, and the liquid 32 is selected to have a low temperature coefficient of expansion. By proper design, the increase in volume of the tube 16 can be made to match the increase in volume of the other elements inside of the tube 16 so that there is temperature compensation.

From the foregoing, it can be seen that there has been provided a simple, rugged, and sensitive pressure to electric transducer with particular protection provided against vibrational difficulties and shipping difficulties.

While, in accordance with the provisions of the statutes, there has been illustrated and described the best known forms of the invention, it will be apparent to those skilled in the art that changes may be made in the form of the apparatus disclosed without departing from the spirit of the invention set forth in the appended claims, and that in some cases certain features of the invention may be used to advantage without a corresponding use of other features.

Having now described my invention, what I claim as new and desire to secure by Letters Patent is as follows:

1. A pressure to electric transducer, comprising, an elongated hollow collapsible tube, an electrical element sealed within said tube, said element comprising a capillary tube having an electrically conducting coating on the inside thereof, an electrically conducting liquid arranged to short circuit a portion of said coating in accordance with the state of collapse of said tube, a second liquid filling all space in said tube outside of said capillary tube and not occupied by said conducting liquid, and a flexible member positioned in said tube to separate said conducting liquid from said second liquid.

2. A pressure to electric transducer, comprising, an elongated hollow collapsible tube, an electrical element sealed within said tube, said element comprising a capillary tube having an electrically conducting coating on the inside thereof, and mounted to extend along the elongated axis of said tube, an opening in said capillary tube at the lower end thereof, an electrically conducting liquid filling a lower portion of said tube and arranged to rise through said opening to short out said coating in accordance with the state of collapse of said tube, a second liquid filling all space in said tube outside of said capillary tube not occupied by said conducing liquid, and a resilient separator positioned between said liquids to maintain said liquids separated and yet maintain sufficient resilience to pass all volume changes of said tube to said capillary tube where said conducting liquid will rise and fall with said changes.

3. In a pressure measuring apparatus, comprising, a hollow elongated collapsible tube, a transducer element positioned within said tube and arranged to move along the longitudinal axis of said tube, a first liquid arranged to act upon said element in accordance with the state of collapse of said tube, a second liquid arranged to fill all space outside of said element not occupied by said first liquid, and a resilient separator positioned between said liquids, said separator being sealed to the inner surface of said tube and to said transducer elements so that said element will be free to move.

4. A pressure measuring apparatus, comprising, an elongated elliptical hollow tube arranged to undergo an internal volume change when exposed to a changing pressure, a capillary coated with an electrically conducting coating sealed within said tube and having a space therein into which a liquid may be passed, an electrically conducting liquid filling a portion of said tube and extending partially into said capillary, a second liquid arranged to fill all space outside of said capillary not occupied by said conducting liquid, and a resilient separator maintaining said liquids separated without effecting displacement of said liquids with internal volume changes of said tube.

5. A pressure transducer, comprising, an elongated hollow elliptical tube being sealed at both ends, a protective element within said tube arranged to prevent the stressing of said tube beyond its elastic limit, a nonporous capillary tube positioned within said element and extending therebeyond at one end, said capillary tube having an opening at said one end, a first liquid arranged for movement within said capillary tube and filling a portion of said tube and capillary tube, a second liquid filling all space in said tube, but not said capillary tube, not occupied by said first liquid, and a resilient separator between said liquids, said separator being sealed to said tube and to said capillary tube at said one end.

6. A pressure to electric transducer comprising, an elongated hollow elliptical tube being sealed at both ends, a protective element mounted within said tube to prevent said tube from being stressed beyond its elastic limit when said tube is exposed to a high pressure, an electrical element comprising a coated capillary tube arranged for longitudinal movement within said protective element, said capillary tube having one end with an opening therein extending beyond said protective element, an electrically conducting liquid filling a portion of said elliptical tube and extending into said capillary tube, a second liquid filling all remaining space in said collapsible tube outside of said capillary tube, a resilient separator between said liquids and sealed to said tubes, and a resilient electrical contacting means connected to said electrical element at the end opposite said one end.

7. A pressure measuring apparatus, comprising, a hollow elongated collapsible tube, a transducer element positioned within said tube, a first liquid arranged to act upon said element in accordance with the state of collapse of said tube, a second liquid arranged to fill all space outside of said element not occupied by said first liquid, and a resilient separator positioned between said liquids, said separator having sufficient preloading to cause said second liquid to fill all said space in said tube in the absence of a counter pressure from said first liquid.

8. A pressure to electric transducer comprising, a hollow elongated collapsible tube, an electrical transducer element extending along the length of said tube, a first liquid arranged to act upon said element along its length starting from a point adjacent one end at a preselected pressure, a second liquid filling the remaining space in said tube outside of said element, and a preloaded resilient separator between said liquids exerting sufficient force upon said second liquid to maintain said remaining space filled independent of any head pressure of said first liquid.

9. A pressure to electric transducer comprising, an electrical resistance element comprising a tube having the sides thereof electrically coated with a resistive material, an electrically short circuiting liquid arranged for movement with respect to said coating to variably short circuit said coating, an elongated collapsible pressure sensing tube whose sides will flex when external pressure change is applied thereto and filled with pressure transmitting liquid, and a diaphragm for transmitting the motion of said pressure transmitting liquid to said short circuiting liquid, said diaphragm being positioned adjacent the end of said collapsible tube, so that said short circuiting liquid is effectively isolated from the collapsible portion of said collapsible tube, and being flexed by the pressure transmitting liquid in accordance with the pressure sensed by said tube so that said short circuiting liquid will move over said coating to variably short the coating in accordance with the applied external pressure.

10. A pressure to electric transducer comprising, an elongated hollow collapsible tube whose internal volume is adapted to change when exposed to an external pressure change, a capillary tube having a conductive coating on the sides thereof, a short circuiting liquid arranged for movement within said capillary tube to electrically short circuit the coating thereof, a pressure transmitting liquid filling said collapsible tube, and a flexible diaphragm separating said short circuiting liquid from said pressure transmitting liquid so that the collapsing of said tube will cause said pressure transmitting liquid to flex said diaphragm and move said short circuiting liquid within said capillary tube.

ROBERT C. DU BOIS.

No references cited.